Sept. 5, 1967     A. SUTARUK     3,339,689
TEMPERATURE RESPONSIVE FLUID COUPLING DEVICE
Filed Oct. 25, 1963
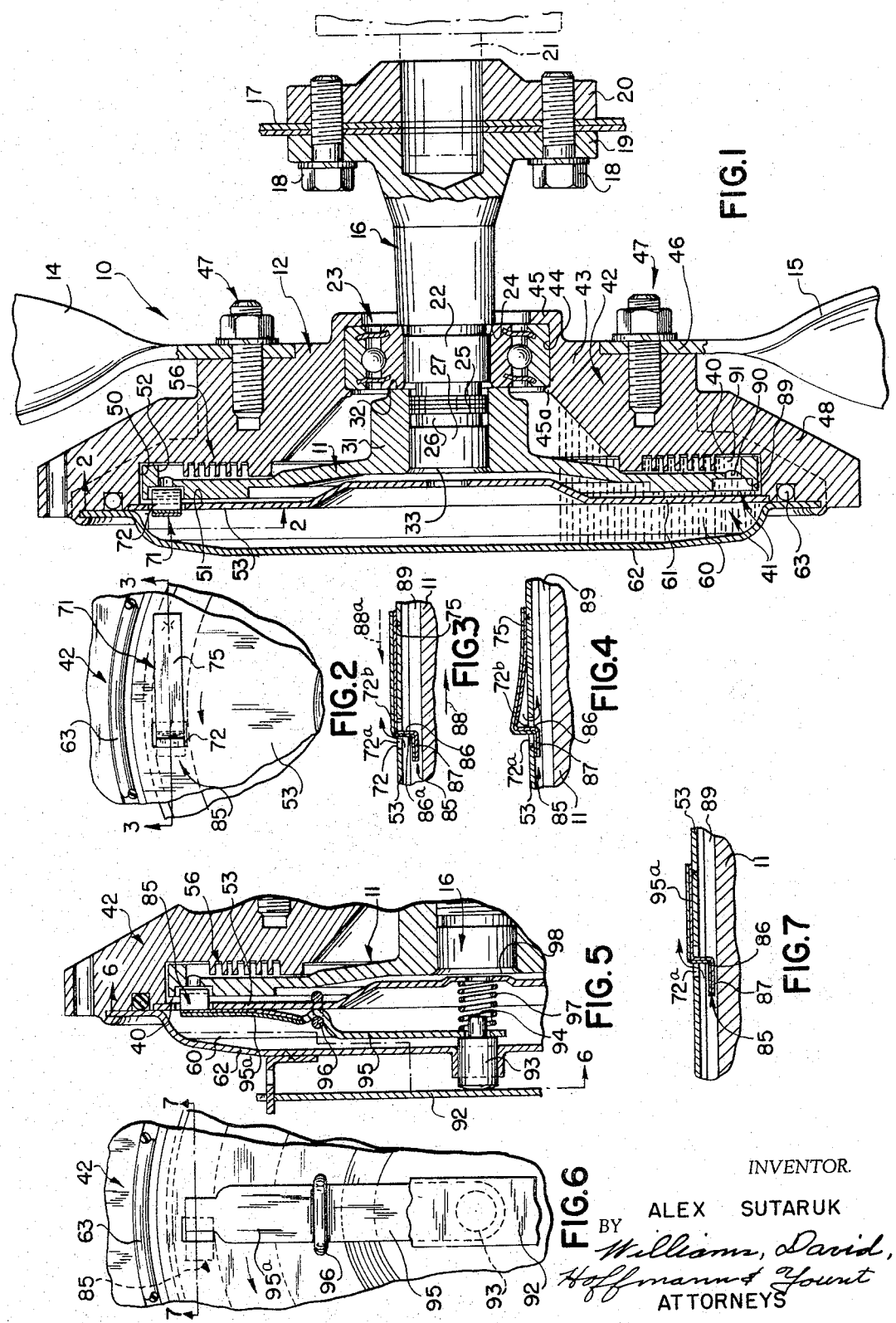
INVENTOR.
ALEX SUTARUK
BY
William, David,
Hoffmann & Yount
ATTORNEYS

United States Patent Office 3,339,689
Patented Sept. 5, 1967

3,339,689
TEMPERATURE RESPONSIVE FLUID
COUPLING DEVICE
Alex Sutaruk, Hazel Park, Mich., assignor to Eaton Yale
& Towne Inc., a corporation of Ohio
Filed Oct. 25, 1963, Ser. No. 318,951
25 Claims. (Cl. 192—58)

The present invention relates to fluid couplings of the type embodying a fluid medium for transmitting torque between relatively rotatable input and output coupling members, and particularly, to a shear type fluid coupling wherein the amount of the fluid medium transmitting torque between the rotatable members can be varied to vary the speed of the output member. Fluid couplings of the above noted type are usable for driving various different kinds of load devices and have particular utility for driving an engine accessory, such as a cooling fan device of an internal combustion engine.

A principal object of the present invention is the provision of a new, improved, simple, compact, readily manufactured and highly durable fluid coupling having a minimum of parts, and constructed so that the volume of the fluid medium transmitting torque between the input and output members can be readily varied.

A further object of the present invention is the provision of a new and improved fluid coupling which includes means sensitive to internal temperatures, and specifically to slip heat generated by the transmission of torque between the coupling members, to control a pumping member to vary the volume of fluid transmitting torque between the coupling members.

A further object of the present invention is the provision of a new and improved fluid coupling which includes a simple one-part internal control for a pumping member for varying the volume of the fluid medium transmitting torque in response to changes in the temperature thereof.

A further object of the present invention is the provision of a new and improved fluid coupling having a temperature responsive device, located wholly within a fluid chamber means formed by the output member and responsive to changes in the temperature of the fluid in the chamber means to actuate a flow producing pumping member for varying the volume of fluid transmitting torque between the coupling members.

A further object of the present invention is the provision of a new and improved fluid coupling including a bimetallic arm member located wholly within a fluid reservoir chamber and which responds to changes in the temperature of the fluid in the chamber to move an impact element supported thereby in opposite directions for effecting flow of fluid into the reservoir chamber from the working chamber and into the working chamber from the reservoir chamber depending upon the direction of movement.

A further object of the present invention is the provision of a new and improved fluid coupling having a pumping member for controlling the flow of fluid between fluid reservoir and storage chambers wherein the movement of the pumping member is controlled by internal and external temperature responsive members.

A further object of the present invention is the provision of a new and improved fluid coupling having a pumping member for effecting a relatively rapid discharge of fluid from a working chamber into a reservoir chamber wherein the pumping member includes an impact portion and a fluid directing portion for directing fluid from the working chamber into the reservoir chamber.

A further object of the present invention is the provision of a new and improved fluid coupling wherein the pumping member is an L-shaped member, one leg of which is an impact element extending axially of the coupling members and against which the fluid in the working chamber is impacted, and the other leg of which extends transverse to the axis of the coupling members and serves to guide or direct the flow of fluid from the working chamber into the reservoir chamber.

A further object of the present invention is the provision of a new and improved fluid coupling having a working chamber and a reservoir chamber which are separated by a partition member having an opening therein communicating the working and reservoir chambers and through which an impact element is adapted to project and wherein the opening through which the impact element projects has a first opening portion through which fluid flows into the working chamber from the reservoir chamber and a second opening portion through which fluid flows from the working chamber into the reservoir chamber.

Further objects, novel characteristics and advantages of the present invention will be apparent from the following detailed description of a preferred embodiment made with reference to the accompanying drawings forming a part of this specification and in which, FIG. 1 is an axial sectional view of a fluid coupling device embodying the present invention;

FIG. 2 is a fragmentary transverse vertical sectional view taken approximately on the section line 2—2 of FIG. 1;

FIG. 3 is a fragmentary sectional view taken approximately along the section line 3—3 of FIG. 2;

FIG. 4 is a fragmentary sectional view similar to FIG. 3 but showing parts in a different operating position;

FIG. 5 is a partial axial sectional view of a modified form of coupling device embodying the present invention;

FIG. 6 is a fragmentary transverse vertical sectional view taken approximately along section line 6—6 of FIG. 5; and FIG. 7 is a fragmentary sectional view of the coupling device of FIG. 6 taken approximately on section line 7—7 of FIG. 6.

The present invention provides, in general, a fluid coupling wherein a viscous shear fluid medium cooperates with input and output coupling members to transmit torque therebetween and wherein the volume of the fluid medium cooperating with the input and output members can be varied to vary the torque transmitted to the output member. As representing a preferred embodiment of the present invention, a fluid coupling device 10 is shown in the drawings and includes an input coupling member 11 and an output coupling member 12. The coupling 10 is here shown as a drive for an engine accessory, and specifically, as a drive for a radiator cooling fan device. It is to be understood, however, that the novel construction of the preferred embodiment of the present invention is not limited in application to a fan drive, but is usable in any application wherein the torque transmission characteristics of a fluid drive are desired along with means to vary the speed differential between the input and output members by varying the amount of the fluid medium transmitting torque between the coupling members.

Referring to the drawings more specifically, FIG. 1 shows a cooling fan engine accessory including fan blades 14, 15, which are driven from the engine through the fluid coupling 10. The fluid coupling includes an input shaft 16 on which input member 11 is mounted and which is rotatable as by a belt drive including a pulley member 17, only a portion of the latter being shown in the drawings. The pulley member 17 is connected to the input shaft 16 at one end thereof by suitable screws 18 which extend through flange portion 19 on the end of the shaft 16 and through openings in the pulley member. The screws 18 are threaded into a hub plate 20 located on the side of the pulley 17 opposite from the flange portion 19 and are effective to clamp the pulley between flange portion 19 and hub plate 20. The hub plate 20 is suitably mounted on a stub shaft 21 which is rotatably supported by the engine block.

The input shaft 16 has intermediate its ends a reduced shaft portion 22 functioning as a support for the inner race of ball bearing assembly 23. A shoulder 24 on the shaft 16 prevents movement of the ball bearing assembly 23 in one axial direction, namely to the right as viewed in FIG. 1. Another shaft portion 25 is provided with surface serrations and a reduced diameter portion 26 connects shaft portion 25 with a further shaft portion 27, at the end of shaft 16 opposite the end having the flange portion 19.

The rotatable input or driving member 11 of the fluid coupling 10 is in the form of a disk having a hub portion 31 supported by the shaft 16. The hub portion 31 has an opening therethrough which has an interference fit with the shaft portions 25 and 27. The hub portion 31 is pressed onto the shaft 16 until the inner surface 32 of the hub 31 abuts the side of the inner race of the ball bearing assembling 23 and thus prevents movement of the ball bearing assembly 23 to the left, as viewed in FIG. 1. The outboard end of the shaft 16 is balled over at 33 to positively retain the coupling member 11 on the shaft. From the above description it should be apparent that the rotation of the shaft 16 causes the input coupling member 11 to be rotated.

The input coupling member 11 rotates in a fluid working or operating chamber 40 forming a part of a fluid chamber means 41 formed by the rotatable output or driven coupling member 12. The output coupling member 12 is in the form of a housing and includes a main housing member 42 having a hub portion 43 with an opening 44 therethrough. The opening 44 has an interference fit with the outer race of the ball bearing assembly 23 and is supported thereby for rotation about the axis of the shaft 16. A flange portion 45 engages the right side of the outer race of the ball bearing assembly 23, as viewed in FIG. 1, and restrains housing member 42 from movement in one axial direction. Preferably, the outer race of the ball bearing assembly is restrained from movement in the opposite axial direction by a rolled over portion 45a of the member 42. The fan blades 14 and 15 are secured to surface portions 46 of the housing member 42 by stud and nut assemblies 47 so as to rotate with the housing member 42. The housing member 42 also includes a plurality of fins 48 for cooling the coupling 10.

The working chamber 40 formed by the output member 12 is defined by a cylindrical surface 50 coaxial with the shaft 16 and by end surfaces 51, 52. The cylindrical surface 50 is provided by a bore in the housing member 42, and the end surface 52 is located at the bottom of the bore. The end surface 51 of the chamber 40 is provided by a partition member 53 in the form of a disk which extends transversely of the shaft 16, and the peripheral edge of which is secured to the housing member 42.

The input member 11 which rotates in the working chamber 40 has a surface portion spaced from the surface 52 of the housing member 42, which surfaces have a plurality of cooperating grooves and lands therein which are designated generally 56 in the drawings. These grooves and lands provide opposed surfaces extending in close parallel face to face relation and have an intervening shear space therebetween. Upon rotation of the disk 11, the fluid in the fluid operating chamber 40 transmits torque from the disk member 11 to the housing member 42, and specifically the fluid in the above mentioned shear space transmits torque between the input and output members by the shear action of the fluid.

The radially outermost surface portion of the disk 11 cooperates with the surface 50 to also provide an intervening shear space therebetween so that when fluid is positioned therebetween, transmission of the torque from the disk member 11 to the housing member 42 is effected. Moreover, the forwardmost surface portion of the disk member 11 cooperates with the surface 51 of the partition member 53 which is spaced therefrom to provide a shear space therebetween to transmit torque between the coupling members when fluid is positioned in this shear space.

The amount of torque transmitted from the disk member 11 to the coupling member 12 is a function of the volume of fluid in the chamber 40 and, specifically, in the above mentioned shear spaces. In the event fluid is not located in any of the shear spaces no torque is transmitted between the input and output members. On the other hand, when fluid fills or partially fills the shear spaces torque is transmitted therebetween. It should be apparent from the above description that if there is no fluid in the chamber 40 and consequently no fluid in the shear spaces there would be no transmission of torque between the input and output members, and as the amount of fluid in the chamber 40 increases, an increasing amount of torque is transmitted between the input and output members and the speed differential between the members is decreased. The fluid level shown in FIG. 1 is the fluid level of the coupling when stationary.

In order to vary the volume of fluid in the chamber 40 and thus vary the torque transmitted and the speed differential between the input and output members, the fluid coupling 10 includes a means providing for flow of fluid into and from the chamber 40. The fluid supplied to the chamber 40 flows thereinto from a fluid reservoir or storage chamber 60, also forming a part of the fluid chamber means 41, and the fluid leaving the chamber 40 flows back into the reservoir or storage chamber 60. The chamber 60 is defined by surface 61 of the partition member 53 which is on the side thereof opposite surface 51, and by a generally circular dish-shaped cover member 62 which forms a portion of the output member 12. The outer peripheral edge of the cover member 62 is secured to the housing member 42 and a suitable sealing ring 63 is positioned therebetween to prevent fluid leakage therebetween.

The means providing for fluid flow between the reservoir or storage chamber 60 and the fluid working chamber 40 includes a fluid conducting means communicating storage chamber 60 with the working chamber 40 and a flow producing mechanism 71 operable to effect fluid flow between chambers 40 and 60 through the fluid conducting means. The fluid conducting means comprises an opening or passageway 72 in the partition member 53 which communicates with the working chamber 40 and the storage chamber 60.

The flow producing mechanism 71 is operable in response to a decrease in the temperature thereof to effect fluid flow from the working chamber 40 into the reservoir chamber 60, to thereby increase the speed differential between output member 11 and input member 12. The flow producing mechanism 71, in response to an increase in the temperature thereof, allows for fluid flow into the working chamber 40 to increase the torque transmitted between the input and output members, as will be apparent from the description below.

The flow producing mechanism 71 is responsive to internal temperatures of the coupling and specifically is responsive to slip heat created by the transmission of torque between the coupling members as well as the heat of the ambient air and thus may be said to be speed responsive since slip heat is a function of speed. The mechanism 71 includes a temperature responsive means supported by the partition member 53 and located wholly within the fluid chamber means 41. The temperature responsive means includes a bimetallic arm member 75 pivotally secured at one end to the partition member 53. The arm member 75 extends transverse to the axis of rotation of the coupling members and is positioned so as to lie along the outer periphery of the partition member 53 and wholly within chamber 60. The temperature of the arm member 75 is substantially the same as the temperature of the fluid in the chamber 60, and the bimetallic arm member, pivots about its pivot point upon a change in the temperature of the arm member, as effected by a change in the temperature of the fluid surrounding the arm member. This pivoting movement is due to the variance in the rate and amount of contraction and expansion of the metal strips forming the arm member, as is well understood in the art.

The free end of the bimetallic arm member, that is, the end not attached to the partition member 53 carries or supports a flow producing or fluid pumping member 85, which is movable axially in opposite directions in response to movement of the arm member 75 and has two extreme positions called a pumping and operating position for purposes of this disclosure. In its pumping position, shown in FIGS. 1 and 3, it functions to pump fluid from the working chamber 40 through the fluid passageway 72 into the reservoir chamber 60 and in its operating position, shown in FIG. 4, it allows for fluid flow from the reservoir chamber through the fluid passageway 72 into the working chamber. When the pumping member 85 is in its pumping position and there is an increase in the temperature of the fluid, the pumping member 85 moves toward the left, as viewed in FIG. 1 and toward its second or operating position, shown in FIG. 4. When the pumping member 85 is in a position other than its pumping position and there is a decrease in temperature, the pumping element 75 moves to the right, as shown in FIG. 1, toward its pumping position. In the event that the temperature change is not sufficient to move the pumping element 75 to either of its extreme positions, it will be located in an intermediate position, as will be described hereinbelow.

The pumping member 85 has a generally L shape and includes an impact element or leg portion 86 connected at one end to the arm member 75 and extending parallel to the axis of the coupling members 11, 12 and a fluid directing portion or leg portion 87 which extends transverse to the axis of the coupling members. In the preferred embodiment, the leg portions 86, 87 are formed of a bimetallic strip like the arm member 75.

When the pumping member 85 is in its pumping position, as shown in FIG. 3, the leg portion 86 thereof extends through passageway 72 and divides the passageway 72 into two opening portion 72a and 72b. Portion 72a may be termed a trailing opening portion and 72b may be termed a leading opening portion since the arrow 88 indicates the direction of rotation of the coupling members, and it can be seen that portion 72b of the opening 72 leads the leg portion 86 during rotation while portion 72a trails leg portion 86. The resistance to rotation offered by the fan blades 14, 15 causes the outer coupling member 12 to lay behind the inner coupling member 11 and provides relative rotation between the coupling members. This relative rotation can be described as counterclockwise rotation of the outer coupling member 12 relative to the inner coupling member 11 and is designated by the dotted arrow 88a in FIG. 3.

The leg portion 87 is connected to the end of leg portion 86 opposite the end connected to arm member 85 and extends therefrom in a direction opposite the direction of rotation so as to be located opposite opening portion 72a. When the pumping member 85 is in pumping position, leg 87 is located in a groove 89. The groove 89 is connected to the shear space formed by the plurality of grooves and lands 56 by a plurality of axially directed passages 90 extending through the input member and disposed slightly radially outwardly of the lands and grooves and which terminate or alternatively are cut away in the form of a V-notch 91 extending radially to direct fluid to and from the grooves and lands.

When the pumping member is in its pumping position as shown in FIG. 3, fluid is impacted against surface 86a of the axially extending leg portion 86 by the input coupling member 11, which rotates faster than output member 12 on which the pumping member 85 is mounted. This causes an increase in fluid pressure adjacent surface 86a of the leg portion 86 or impact element adjacent opening portion 72a. The leg portion 87, which extends transverse to the axis of the coupling members, directs or guides the fluid through the opening 72, and specifically through the trailing opening portion 72a. This construction provides a scoop type action which readily provides for flow from chamber 40 and provides for a rapid discharge of fluid from the chamber. As can be seen in FIG. 3, the arm 85 substantially blocks flow through opening portion 72b when in pumping position so as to minimize fluid flow therethrough into chamber 40.

When the pumping member 85 is in its operating position allowing for fluid flow into the working chamber 40, as shown in FIG. 4, the impact leg portion 86 is located out of the working chamber 40. The leg portion 87 which directs the fluid through the passageway portion 72a is in tight engagement with the partition member 53 and blocks fluid flow through opening portion 72a. As shown in FIG. 4, when the pumping member 85 is in this position the fluid flows from the storage chamber 60 into the working chamber 40 through leading opening portion 72b due to the centrifugal force of the fluid in the storage chamber 60, thereby increasing the fluid in the working chamber 40 and decreasing the differential in torque between the input and output members. In addition there is a low pressure area created adjacent opening 72b created by the action of coupling member 11 moving past opening 72b and the edge of the leg 86. This low pressure area acts to draw fluid into the working chamber. Without this effect at high slip speeds the engaged coupling would tend to evacuate the working chamber due to the high centrifugal force in the working chamber in relation to the centrifugal force in the reservoir chamber. This would cause the fluid to flow into the reservoir chamber and cause a decrease in torque transmission. By creating the low pressure area as described, the centrifugal forces adjacent opening 72b are such as to prevent flow into the reservoir chamber at high slip speeds.

When the impact element is moved to an intermediate position, fluid flow between the reservoir and working chambers is effected until a state of fluid equilibrium is attained. When the impact element 85 moves from any given position toward its pumping position a greater area of the surface 86a of the impact element is positioned in the working chamber and fluid is thereby impacted against a greater area of surface 86a causing fluid pressure to be created adjacent surface 86a adjacent opening 72a and thereby effects fluid flow from the working chamber as described above. If the impact element moves from a given position toward its operating position, a lesser area of the surface 86a is positioned in the working chamber and fluid is impacted against a lesser area of surface 86a causing fluid pressure forward of surface 86a and adjacent opening 72a to decrease and to effect fluid flow into the working chamber as described above.

Thus it should be apparent that the embodiment of the present invention shown in FIG. 1 provides a highly improved fluid coupling embodying a temperature responsive means in the form of a bimetallic arm member located wholly within a fluid chamber means and which is responsive to the temperature of the fluid in the chamber to effect a change in the volume of fluid in the working chamber and thus vary the amount of fluid transmitted from the input member 11 to the output member 12.

The fluid coupling shown in FIGS. 5 to 7 is of substantially the same general construction and operation as the fluid coupling shown in FIGS. 1 to 4, and the reference numerals used to designate parts of the coupling shown in FIGS. 1 to 4 are used to designate the corresponding parts of the coupling of FIGS. 5 to 7. The coupling device shown in FIG. 5 includes a pumping member 85 which is movable into and out of the working chamber 40 to provide for fluid flow through a fluid passageway opening 72 into the working chamber 40 and from the working chamber 40, as described above in connection with the pumping element of the fluid coupling shown in FIGS. 1–4. The mechanism for moving the pumping member 85 of the coupling of FIGS. 5–7 between is first and second positions differs from the mechanism for moving the pumping member of the fluid coupling of FIG. 1.

The mechanism for moving the pumping member 85 between its first and second positions, in the coupling shown in FIG. 5, includes an external temperature responsive device 92 comprising a bimetallic strip anchored at its opposite ends to suitable members attached to the cover 62. The strip 92 expands and contracts axially as the temperature around the coupling 10 increases and decreases and bows axially in response to a temperature increase. The strip 92 engages a pin or cylinder member 93 slidably supported by the cover member 62. The pin 93 slides axially of the coupling members in response to bowing of the strip 92.

The pin 93 includes a shaft portion 94 which extends through an opening in a radially extending arm member 95 forming a part of the flow producing mechanism 71. The arm member 95 is movable generally axially of the coupling members and to this end it is pivoted intermediate its ends by a suitable pivot arrangement 96 supported by the partition member 53 and providing for pivotal movement of the arm member 95 about an axis transverse to the axis of the shaft 16. The arm member is biased in a clockwise direction and is held in tight engagement with the right side of the temperature sensing device 92, as viewed in FIG. 5, by a suitable coil spring 97. The coil spring 97 also functions to hold the pin 93 in engagement with the strip 92. A portion of the spring 97 encircles the shaft portion 94 and one end of the spring 97 engages the arm member 95 and the other end of the spring engages a suitable reaction portion 98 of the partition member.

When the temperature sensing device senses an increase in the temperature it expands axially against the bias of the spring 97 and moves the arm 95 in a counter-clockwise direction, as viewed in FIG. 5. The outermost end of the arm 95, namely the portion 95a which extends from the pivot arrangement 96 outwardly and which is located in the reservoir chamber 60, is bimetallic and is thus an internal temperature sensing device. The outermost end of the portion 95a supports the pumping element 85, which is also bimetallic and forms an internal temperature sensing device. Thus the coupling shown in FIGS. 5 to 7 includes an external temperature sensing device 92 and an internal temperature sensing device 95a. The external temperature sensing device is responsive to the ambient temperature while the internal temperature sensing device is responsive to the temperature of the fluid.

Upon sensing an increase in the temperature around the fluid coupling, the temperature responsive strip 92 expands axially to move the arm 95 against the bias of the spring 97 to effect movement of the pumping element 85 from its first or pumping position to its second or operating position allowing for fluid flow into the working chamber 40. When the temperature responsive strip 92 senses a decrease in temperature, the temperature responsive device 92 contracts axially and the spring 97 pivots the arm member 95, which in turn moves the pumping member 85 axially of the coupling members toward its pumping position shown in FIG. 7, providing for fluid flow from the working chamber 40. At the same time the internal temperature responsive device 95a functions to position the pumping element 85 in response to the temperature of the fluid in the reservoir chamber.

The internal and external temperature sensing devices cooperate to produce a desirable fan output speed. The internal temperature sensing device 95a is speed sensing, since it is responsive to the temperature of the fluid and, at low input speeds, it keeps the pumping element 85 in its pumping position or in an intermediate position, even though the external temperature sensing device senses a relatively high ambient temperature which would be sufficient to move the pumping element 85 to it operating position, in the absence of the internal sensing device. On the other hand the internal temperature sensing device, at high input speeds which create a relatively high temperature in the fluid, will move the pumping element 85 toward its operating position. However, if the ambient temperature is relatively low, the external temperature sensing device will tend to keep the pumping element in its pumping position and the effect on the pumping element 85 will be to position it in response to both the internal temperature and ambient temperature. At high ambient temperatures and high input speeds, both temperature sensing devices will tend to move the pumping element 85 to its operating position.

The couplings shown in FIGS. 1 and 5 can be set so that the coupling is fully engaged, that is the pumping element 85 is in its operating position and the fluid working chamber is filled with fluid, only at very high rates of slip heat on input speeds and not at any normally encountered ambient temperature. This is useful in keeping the working chamber partially evacuated at lower input speeds and normally encountered ambient temperatures such as are encountered in city driving. This reduces fan over-speed upon engine acceleration during city driving.

It should be understood that the preferred embodiment of the present invention has been described herein in considerable detail and that certain modifications, changes, and adaptations may be made therein by those skilled in the art and that it is hereby intended to cover all modifications, changes and adaptations thereof falling within the scope of the appended claims.

Having described my invention, I claim:

1. A fluid coupling comprising a first rotatable member defining a fluid chamber means, a second rotatable member having a portion of the periphery thereof rotatable in said fluid chamber means, said first and second rotatable members having spaced opposed surface portions defining a shear space therebetween and cooperable with a fluid shear medium within said shear space to provide a shear type fluid drive between said members, a flow producing member movable in a first direction to allow for fluid flow into said shear space and in a second direction opposite said first direction to effect fluid flow from said shear space, and temperature responsive means located wholly within said chamber means for moving said member in said first and second directions.

2. A fluid coupling comprising a first rotatable member defining a fluid chamber means, a second rotatable member having a portion of the periphery thereof rotatable in said fluid chamber means, said first and second rotatable members having spaced opposed surface portions defining a shear space therebetween and cooperable with a fluid shear medium within said shear space to provide a shear type fluid drive between said members, a flow producing member movable in a first direction to allow for fluid flow into said shear space and in a second direction opposite said first direction to effect fluid flow from said shear space, and a temperature responsive bimetallic arm member supporting said flow producing member and movably supported by said first rotatable member for moving said member in said first and second directions.

3. A fluid coupling comprising a first rotatable member defining a fluid chamber means, a second rotatable member having a portion of the periphery thereof rotatable in said fluid chamber means, said first and second rotatable members having spaced opposed surface portions defining a shear space therebetween and cooperable with a fluid shear medium within said shear space to provide a shear type fluid drive between said members, a flow producing member having a first position allowing for fluid flow into said shear space and a second position for effecting fluid flow from said shear space, a temperature responsive bimetallic arm member supporting said flow producing element, said arm member being movably supported by said first rotatable member for moving said element between its said positions in response to temperature changes and being located wholly within said chamber means.

4. A fluid coupling comprising a first rotatable member having a fluid working chamber and a fluid reservoir chamber separated by a partition member, a second rotatable member having a portion rotatable in said working chamber, said first and second rotatable members having spaced opposed surface portions defining a shear space therebetween and cooperable with a fluid shear medium within said shear space to provide a shear type fluid drive between said members, a fluid conducting passage means in said partition member communicating said working and reservoir chambers and for directing the flow of fluid between said working and reservoir chambers, a bimetallic arm member movably supported by said first rotatable member and movable in response to changes in temperature, and a flow producing member supported by said arm member and movable therewith between a first position allowing for fluid flow through said passage means from said reservoir chamber into said working chamber and a second position for effecting fluid flow through said passage means from said working chamber into said reservoir chamber.

5. A fluid coupling as defined in claim 4 wherein said arm member is pivotally connected to said partition member for movement about an axis extending transverse to the axis of rotation of said coupling members and is located wholly within said reservoir chamber.

6. A fluid coupling as defined in claim 5 wherein said fluid conducting passage means in said partition member includes an opening in said partition member through which said flow producing member extends, and said opening includes a first opening portion for conducting fluid from the working chamber into the reservoir chamber and a second opening portion for conducting fluid from the reservoir chamber into the working chamber, said first and second opening portions being separated by said flow producing member.

7. A fluid coupling as defined in claim 4 wherein said flow producing member comprises a substantially L-shaped member having one leg thereof extending axially of the coupling members and the other leg thereof extending transverse to the axis of the coupling members.

8. A fluid coupling as defined in claim 6 wherein said flow producing member comprises a substantially L-shaped member having one leg thereof extending axially of said coupling members through said opening in said partition member and dividing said opening into said first and second opening portions, and the other leg thereof extends transverse to the axis of said coupling members and is located opposite said first opening portion.

9. A fluid coupling as defined in claim 8 wherein said other leg of said L-shaped member engages said partition member and blocks the flow of fluid through said first opening portion when said flow producing member is in its said first position providing for fluid flow from the reservoir chamber through said second opening portion into said working chamber.

10. A fluid coupling comprising a first rotatable member defining a fluid chamber means, a second rotatable member having a portion of the periphery thereof rotatable in said fluid chamber means, said first and second rotatable members having spaced opposed surface portions defining a shear space therebetween and cooperable with a fluid shear medium within said shear space to provide a shear type fluid drive between said members, a substantially L-shaped flow producing member having a first position allowing for fluid flow into said shear space and a second position for effecting fluid flow from said shear space, and temperature responsive means for moving said L-shaped flow producing member between its said first and second positions.

11. A fluid coupling comprising a first rotatable member having a fluid working chamber and a fluid reservoir chamber separated by a partition member, a second rotatable member having a portion rotatable in said working chamber, said first and second rotatable members having spaced opposed surface portions defining a shear space therebetween cooperable with a fluid shear medium within said shear space to provide a shear type fluid drive between said members, a fluid conducting passage means in said partition member communicating said working and reservoir chambers and for directing the flow of fluid between said working and reservoir chambers, a substantially L-shaped movable flow producing member having a first position allowing for fluid flow through said passage means from said reservoir chamber into said working chamber and a second position for effecting fluid flow through said passage means from said working chamber into said reservoir chamber, and temperature responsive means for moving said L-shaped flow producing member between its said first and second positions.

12. A fluid coupling as defined in claim 11 wherein said L-shaped member comprises one leg portion extending axially of the coupling members and another leg portion extending transverse to the axis of the coupling members.

13. A fluid coupling as defined in claim 12 wherein said fluid conducting passage means in said partition member includes an opening in said partition member through which said one leg portion of said L-shaped member extends and divides said opening into first and second opening portions, said first opening portion functioning to conduct fluid from the working chamber into the reservoir chamber and said second opening portion functioning to conduct fluid from the reservoir chamber into the working chamber, and said another leg of said L-shaped member extends transverse to the axis of said coupling members and lies opposite to said first opening portion.

14. A fluid coupling as defined in claim 11 wherein said temperature responsive means comprises a bimetallic arm member supporting said flow producing member and movable in response to changes in the temperature thereof to effect movement of said flow producing member.

15. A fluid coupling as defined in claim 13 wherein said another leg of said L-shaped member engages said partition member and blocks fluid flow through said first opening portion when said L-shaped member is in its operating position providing for fluid flow from the reservoir chamber through said second opening portion into said working chamber.

16. A device of the class described comprising a housing member having a fluid working chamber and a fluid reservoir chamber separated by a partition member, a rotatable member having a portion rotatable in said working chamber, a fluid conducting opening in said partition member for directing the flow of fluid between said working and reservoir chambers, a substantially L-shaped movable flow producing member having one leg portion extending axially of said rotatable member and through said opening in said partition member dividing said opening in said partition member into first and second opening portions and a second leg portion extending transverse to the axis of said rotatable member and lying opposite said first opening portion, and means for moving said L-shaped member from a first position projecting into said working chamber wherein said fluid in said chamber is impacted against said one leg portion and effects an increased pressure behind said one leg portion, fluid pressure is directed through said first opening portion by said second leg portion into said reservoir chamber and a second position allowing for fluid to flow through said second opening portion from said reservoir chamber into said working chamber.

17. A fluid coupling comprising a first rotatable member having a fluid working chamber and a fluid reservoir chamber separated by a partition member, a second rotatable member having a portion rotatable in said working chamber, said first and second rotatable members having spaced opposed surface portions defining a shear space therebetween and cooperable with a fluid shear medium within said shear space to provide a shear type fluid drive between said members, a fluid conducting passage means in said partition member communicating said working and reservoir chambers, an arm member supported for movement relative to said first rotatable member, and a flow producing member supported by said arm member and movable therewith between a first position allowing for fluid flow through said passage means into said working chamber from said reservoir chamber and a second position providing for fluid flow through said passage means from said working chamber into said reservoir chamber and including a fluid impact arm portion extending substantially parallel to the axis of rotation of said coupling members and a fluid directing arm portion connected to said impact portion and extending transverse to the axis of rotation of said coupling members.

18. A fluid coupling comprising a first rotatable member defining a fluid chamber means, a second rotatable member having a portion of the periphery thereof rotatable in said fluid chamber means, said first and second rotatable members having spaced opposed surface portions defining a shear space therebetween and cooperable with a fluid shear medium within said shear space to provide a shear type fluid drive between said members, a flow producing member movable in a first direction to allow for fluid flow into said shear space and in a second direction opposite said first direction to effect fluid flow from said shear space, and temperature responsive means for effecting movement of said flow producing member in said first and second directions including a first temperature responsive device located wholly within said fluid chamber means for sensing the temperature of the fluid in said fluid chamber means, and a second temperature responsive device supported by said first rotatable member externally thereof for sensing the external ambient temperature.

19. A fluid coupling as defined in claim 18 wherein said first and second temperature responsive devices are bimetallic members supported by said first rotatable member and movable in response to temperature changes.

20. A fluid coupling as defined in claim 19 wherein said flow producing member is supported by the bimetallic member forming said internal temperature responsive device and is an L-shaped member having one leg thereof extending axially of said coupling members and the other leg thereof extending transverse to the axis of said coupling members.

21. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising a bimetal strip having a cantilever mounting on the face of said plate adjacent said drive chamber, the free end of said strip being disposed adjacent to said port but trailing said port in the direction of rotation of said plate relative to said drive disc and movable away from said plate into said drive chamber upon a predetermined decrease in the temperature ambient to said bimetal strip to thereupon pump fluid from said drive chamber through said port and into said storage chamber, whereby the degree of coupling between said casing and said disc varies with changes in said temperature.

22. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising a temperature responsive means mounted on said plate adjacent said drive chamber, said temperature responsive means including an abutment member disposed adjacent said port but trailing said port in the direction of rotation of said plate relative to said drive disc and movable away from said plate into the path of the fluid in the drive chamber upon a predetermined change in the temperature ambient to said temperature responsive means to thereupon pump fluid from said drive chamber through said port and into said storage chamber, whereby the degree of coupling between said casing and said disc varies with changes in said temperature.

23. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends from the surface of said plate into said drive chamber and an inactive position wherein it is withdrawn from said drive chamber, a bimetal element mounted within said storage chamber and having a portion cooperating with said abutment member for movement thereof, said bimetal element upon a predetermined decrease in temperature ambient thereto moving said abutment member into its said active position and returning said abutment member to its said inactive position upon a predetermined increase in said temperature, whereby fluid is transferred between said drive chamber and said storage chamber in response to changes in said ambient temperature to thereby vary the degree of coupling between said casing and said disc.

24. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, an aperture in said plate providing a port opening into said reservoir and into said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends from the surface of said plate into said drive chamber and an inactive position wherein it is withdrawn from said drive chamber, a temperature responsive element mounted within said casing and having a portion cooperating with said abutment member for movement thereof, said temperature responsive element upon a predetermined change in one sense in the temperature ambient thereto moving said abutment member into its said active position and returning said abutment member to its said inactive position upon a predetermined change in the opposite sense in said temperature, whereby fluid is transferred between said drive chamber and said storage chamber in response to changes in said ambient temperature to thereby vary the degree of coupling between said casing and said disc.

25. A fluid coupling device comprising a drive shaft, driven means comprising an outer casing and a divider plate rotatably mounted on said shaft, said divider plate separating the space within said casing into a fluid reservoir and a drive chamber, a drive disc mounted on said shaft within said drive chamber, opposed shear surfaces on said drive disc and said driven means disposed in close face-to-face and spaced relationship, a port in said driven means providing fluid communication between said reservoir and said drive chamber for filling the spaces between said shear surfaces with fluid from said reservoir to create fluid drive coupling of said casing and said disc, the degree of coupling therebetween varying with the volume of fluid in said drive chamber, a pump means for transferring fluid between said chamber and said reservoir through said port, said pump means comprising an abutment member supported for movement with respect to said plate and disposed adjacent to said port but trailing said port in the direction of rotation of said plate relative to said drive disc, said abutment member being movable between an active position in which it extends into the path of the fluid in the drive chamber and an inactive position wherein it is withdrawn from said fluid path, and condition responsive means disposed within said casing for shifting said abutment member between its said positions whereby fluid is transferred between said drive chamber and said storage chamber in response to changes in said condition to thereby vary the degree of coupling between said casing and said disc.

References Cited
UNITED STATES PATENTS 3,135,370   6/1964   Sutton  --------------- 192—58
3,191,733   6/1965   Weir  ----------------- 192—58

MARK NEWMAN, *Primary Examiner.*

DON A. WAITE, *Examiner.*

A. T. McKEON, *Assistant Examiner.*